2,861,052

VINYL CHLORIDE RESIN STABILIZED WITH POLYHYDRIC ALCOHOL AND FRIEDEL-CRAFTS CATALYST

Stanley B. Elliott, Walton Hills, Ohio, assignor to Ferro Chemical Corporation, Bedford, Ohio, a corporation of Ohio No Drawing. Application January 4, 1954
Serial No. 402,140

5 Claims. (Cl. 260—45.75)

This invention relates to new compositions of matter and more particularly to compositions which make halogenated hydrocarbons resistant to the degradation effects of heat and/or light.

It is well known to those skilled in the art that severe exposure of such resinous materials as chlorinated paraffins, polyvinyl chloride, polyvinylidene chloride and copolymers, to heat and/or light brings about discoloration, brittleness and loss of strength. This degradation is especially pronounced during the various fabrication processes these resinous materials are subjected, such as injection molding, calendering, etc.; operations which require heating.

It is my theory that the degradation of these halogenated hydrocarbons occurs through several different chemical mechanisms, such as, evolution of HCl, free radical formation and depolymerization. While there are innumerable stabilizers in the prior art, such as, organic lead salts, alkaline earth salts, etc., no one of these prior art materials has satisfactorily overcome the degradation problem.

It is, therefore, the principal object of the present invention to provide stabilizing agents for halogenated-hydrocarbons which are superior to those of the prior art.

A further object of this invention is to provide stabilizing agents which make halogenated hydrocarbons resistant to sulfur staining.

A still further object of this invention is to provide stabilizing agents which are economical and easy to incorporate into halogen containing hydrocarbon resins.

Other objects will become apparent as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention, may be employed.

Broadly stated this invention comprises a new composition of matter comprising an intimate admixture of a colorless Friedel-Crafts type catalyst and a primary aliphatic polyhydric alcohol having at least three hydroxyl groups of which at least two hydroxyl groups are free and have a boiling point not less than 250° F.

As is well known to those skilled in the art, that while aluminum chloride is the best known of the Friedel-Crafts type catalysts many other metal halides are also known and used as Friedel-Crafts type catalysts. Among those that may be listed as the more important Friedel-Crafts type catalysts are the halides of antimony, zinc, tin, titanium, zirconium, beryllium, boron, cadmium and bismuth. It will be noted that in the foregoing enumeration of Friedel-Crafts cations, iron has been omitted. Since one of the objects of this invention is the retention of the original color or colorless condition of the resin involved, iron cannot be used. Iron being a material of high coloring properties would tend to discolor the resin being stabilized and thus defeat the purpose of the invention.

As previously defined the polyhydric alcohols which are applicable to the present invention must be primary aliphatic alcohols having at least three hydroxyl groups of which two hydroxyl groups are free and have a boiling point not less than 250° F.

By intensive study I have found that alcohols having secondary or tertiary OH groups are only moderately successful or completely unsuccessful in the stabilizer compositions of this invention. Even alcohols having some primary OH groups along with secondary and tertiary OH groups are undesirable. Therefore it cannot be emphasized too strongly that the compositions of this invention are intended only to include those aliphatic polyhydric alcohols having at least three primary OH groups of which two of the OH groups must be free. Further, since halogenated hydrocarbon resins are processed at from 250° F. to about 350° F. it is necessary that the primary polyhydric alcohols used must be able to withstand processing temperatures without boiling off. Therefore the primary polyhydric alcohols must have a boiling point of at least 250° F.

It is also within the contemplation of this invention to use alcohols, as defined above, having ether or ester groups attached thereto, however, the alcohol having an ether or ester group must have at least two free primary OH groups and the alcohol before esterification or etherification must have had a total of at least three OH groups.

The primary aliphatic polyhydric compounds which have been found particularly useful in this invention are as follows:

Trimethylolethane
Trimethylolpropane
Tetramethylolcyclohexanol
Pentaerythritol
Tripentaerythritol
Dipentaerythritol The Friedel-Crafts material and primary aliphatic polyhydric alcohols may be admixed in proportions of .05 to 100 parts of Friedel-Crafts catalyst per 100 parts of polyhydric material.

The above mentioned stabilizer may be used in halogenated hydrocarbon resins in the ratio of 0.5%–10% of stabilizer per 100 parts of resin.

As previously mentioned various hydrogen chloride acceptors such as, alkaline earth salts and soaps, lead soaps and epoxy compounds, have been used in the prior art to effect stabilization of halogenated hydrocarbon resins, particularly polyvinyl chloride. However, while these materials have been acceptable in many cases they have never done as thorough a job as desired by industry.

I have found that the oxides, hydrates and carbonates of the alkaline earth metals, the alkaline earth metal soaps, the oxides, hydrates and carbonates of lead, the lead soaps, epoxy compounds and metal alcoholates are HCl acceptors which can be combined with the aforementioned stabilizers to produce a synergistic effect which makes the mixtures outstanding as stabilizing agents.

As stated above, degradation of halogenated hydrocarbon resins occurs through several different chemical mechanisms. It is my theory that the Friedel-Crafts type catalysts catalyze the reaction between the primary polyhydric alcohol and the free radicals formed by the degradation of the resin and the hydrogen chloride acceptors present in the composition prevent free HCl. Nevertheless, regardless of the theory I have found a synergism does exist between the Friedel-Crafts type catalysts and primary polyhdric alcohol and the hydrogen chloride acceptors.

The above named hydrogen chloride acceptors when used in combination with the Friedel-Crafts type catalyst polyhydric alcohol mixture are used in the proportion of 5–1000 parts per 100 parts of Friedel-Crafts type catalyst-polyhydric alcohol mixture.

The stabilizers of this invention whether they are the Friedel-Crafts-polyhydric admixtures alone or in combination with the hydrogen chloride acceptors are used in the ratio of 0.5% to 10% per 100 parts, of halogenated hydrocarbon resin.

So that the present invention may be more clearly understood the following examples are offered as being illustrative of the invention.

The following group of examples show the Friedel-Crafts polyhydric alcohol admixture.

I

15% cadmium chloride
85% pentaerythritol

II

10% antimony chloride
90% trimethylolethane

III

12% zinc chloride
88% pentaerythritol

The next group of examples show the Friedel-Crafts-polyhydric alcohol admixture in combination with a hydrogen chloride acceptor.

IV

7% zinc chloride
27% barium oxide
66% penaerythritol

V

20% tin chloride
23% barium oxide
57% tripentaerythritol

VI

7% zinc chloride
27% basic lead carbonate
66% trimethylolpropane

The following examples illustrate the stabilizers of this invention in combination with a halogenated hydrocarbon resin. In the following examples standard compositions comprising 100 parts of polyvinyl chloride polymer, 47 parts plasticizer (dioctylphthalate), 2 parts lubricant (stearic acid) were thoroughly mixed.

VII

To one portion of the above composition no stabilizer was added. To a second equal amount of such composition was added 0.5 part of barium oxide. To a third portion of the above composition there was added 0.5 part barium oxide and 0.10 part zinc chloride. To a fourth portion of the composition there was added 0.10 part zinc chloride and 1.6 parts pentaerythritol. To a fifth portion was added 0.5 part barium oxide, 0.10 part zinc chloride and 1.6 parts pentaerythritol. All the compositions were then milled on a two roll mill at 350° F. The following results were noted.

A. The composition containing no stabilizer turned dark yellowish brown at 20 minutes.

B. The composition containing 0.5 part barium oxide turned dark orange at 20 minutes.

C. The composition containing the 0.5 part barium oxide and 0.16 part zinc chloride turned black and spongy at 20 minutes.

D. The composition containing the 0.10 part zinc chloride and 1.6 parts pentaerythritol turned dark yellow at 60 minutes. This result clearly shows the superior effect of the Friedel-Crafts and polyhydric alcohol admixture.

E. The composition containing the 0.5 part barium oxide, 0.10 part zinc chloride and 1.6 parts pentaerythritol turned a very pale yellow at 60 minutes. This result clearly establishes the synergism obtained between the hydrogen chloride acceptors (barium oxide) and the Friedel-Crafts-polyhydric alcohol system.

VIII

The same procedure as in Example VII was followed except that 0.15 part of cadmium chloride were used as the Friedel-Crafts material.

A. The composition with no stabilizer turned dark brown at 20 minutes.

B. The composition containing the 0.5 part barium oxide turned dark orange at 20 minutes.

C. The composition containing the 0.5 part barium oxide and 0.15 part cadmium chloride turned black at 20 minutes.

D. The composition containing the 0.15 cadmium chloride and 1.6 parts pentaerythritol turned dark yellow at 60 minutes. Here again the effectiveness of the Friedel-Crafts and polyhydric alcohol admixture is demonstrated.

E. The composition containing the 0.15 part cadmium chloride, 0.5 part barium oxide and 1.6 parts pentaerythritol turned very pale yellow at 60 minutes. Thus again demonstrating the outstanding effect of the synergism between the Friedel-Crafts-polyhydric alcohol and the hydrogen chloride acceptor.

IX

The same procedure as in Example VIII was followed except that 0.2 part antimony chloride was used as the Friedel-Crafts type catalyst.

A. The results showed the same as VIII A.
B. The results showed the same as VIII B.
C. The results showed the same as VIII C.

D. The composition containing the 0.2 part antimony and 1.6 parts pentaerythritol turned dark yellow at 30 minutes. The antimony chloride is not as effective as the other Friedel-Crafts materials, however, is still far better than other prior art stabilizers.

E. The composition containing the 0.2 part antimony chloride, 0.5 part barium oxide and 1.6 parts pentaerythritol turned pale yellow at 30 minutes. The synergistic effect is here again strongly demonstrated.

X

The same procedure as in Example VII was followed except that 0.5 part of the condensation product of epichlorohydrin and bisphenol was substituted for the barium oxide as the hydrogen chloride acceptor.

A. The composition with no stabilizer turned dark brown at 20 minutes.

B. The composition containing the 0.5 part of the condensation product of epichlorohydrin and bisphenol turned brown at 20 minutes.

C. The composition containing the 0.5 part of the condensation product of epichlorohydrin and bisphenol and 0.10 part of zinc chloride turned black at 20 minutes.

D. The composition containing 0.10 part of zinc chloride and 1.6 parts of pentaerythritol turned dark yellow at 60 minutes.

E. The composition containing 0.5 part of the condensation product of epichlorohydrin and bisphenol, 0.10 part of zinc chloride and 1.6 parts pentaerythritol turned pale yellow at 60 minutes.

The stabilizing agents may be incorporated by a number of methods. They may be added to the solid resin and mixed therein by means of hot rolls or other mixing machines adapted to mix solid resins. They may also be dispersed in a suitable liquid and then mixed with the resin, or the dispersion of the stabilizer may be mixed with a solution of the resin. The only important requisite is that the stabilizers and resin are throughly mixed and dispersion is as complete as possible.

As is well known vinyls degrade through chain type decomposition with a relatively large concentration of highly active free radicals being formed in the process. Since the stabilizers of this invention have effective free radical terminating abilities, the free radical attack on many sensitive organic pigments, which leads to bleaching or other color changes is eliminated.

From the foregoing discussion it will be readily seen that the stabilizers of the present invention are easily made, are comprised of relatively cheap ingredients, are compatible with pigments and above all give stabilization superior to prior art materials. It may also be noted that the use of antimony as the Friedel-Crafts catalyst in addition to stabilizing the halogenated hydrocarbon resins will afford flame proofing properties.

Other modes of applying the principle of the invention may be employed change being made as regards the details described, provided the features stated in any of the following claims or the equivalent of such be employed.

I, therefore, particularly point out and distinctly claim as my invention:

1. A composition of matter comprising a vinyl chloride resin and from 0.5% to 10% per 100 parts of said resin of a stabilizer, said stabilizer comprising an intimate admixture of a colorless Friedel-Crafts catalyst and a primary aliphatic polyhydric alcohol having at least three hydroxyl groups of which at least two hydroxyl groups are free and a boiling point not less than 250° F.

2. A composition of matter comprising a vinyl chloride resin and from 0.5% to 10% per 100 parts of said resin of a stabilizer, said stabilizer comprising a primary aliphatic polyhydric alcohol having at least three hydroxyl groups of which at least two hydroxyl groups are free and a boiling point not less than 250° F. and from .05 to 100 parts per 100 parts of said alcohol of a material selected from the group consisting of the halides of Al, Sb, Zn, Sn, Ti, Zr, Be, B, Cd and Bi.

3. A composition of matter comprising a vinyl chloride resin and from 0.5% to 10% per 100 parts of said resin of a stabilizer, said stabilizer comprising a primary aliphatic polyhydric alcohol having at least three hydroxyl groups of which at least two hydroxyl groups are free and a boiling point not less than 250° F., from .05 to 100 parts per 100 parts of said alcohol of a material selected from the group consisting of the halides of Al, Sb, Zn, Sn, Ti, Zr, Be, B, Cd and Bi and from 5–1000 parts of a hydrogen chloride acceptor per 100 parts of said metal halides and polyhydric materials.

4. A composition of matter comprising polyvinyl chloride and from 0.5% to 10% per 100 parts of said polyvinyl chloride of an admixture comprising pentaerythritol and from .05 to 100 parts per 100 parts of pentaerythritol of zinc chloride.

5. A composition of matter comprising polyvinyl chloride and from 0.5% to 10% per 100 parts of said polyvinyl chloride of an admixture comprising pentaerythritol and from .05 to 100 parts per 100 parts of pentaerythritol of zinc chloride and from 5 to 1000 parts per 100 parts of pentaerythritol of barium oxide.

References Cited in the file of this patent

UNITED STATES PATENTS

| | | |
|---|---|---|
| 2,157,997 | Brous | May 9, 1939 |
| 2,257,384 | Johnston | Sept. 30, 1941 |
| 2,378,739 | Taft | June 19, 1945 |
| 2,412,200 | Blum | Dec. 10, 1946 |
| 2,459,746 | Radcliffe | Jan. 18, 1949 |
| 2,483,959 | Baer | Oct. 4, 1949 |
| 2,711,401 | Lally | June 21, 1955 |
| 2,721,186 | Tawney | Oct. 18, 1955 |
| 2,789,994 | Ramsden et al. | Apr. 23, 1957 |

OTHER REFERENCES

Ellis: "Chemistry of Petroleum Derivatives," vol. II, page 560; published 1937 by Reinhold Publishing Company. (Copy in Division 31.)